(12) United States Patent
Tsuda et al.

(10) Patent No.: US 11,924,695 B2
(45) Date of Patent: *Mar. 5, 2024

(54) MOBILE TELECOMMUNICATIONS SYSTEM METHOD INCLUDING SWITCHING BETWEEN RADIO RESOURCES BASED ON MEASURED SIGNAL PROPERTIES

(71) Applicant: SONY GROUP CORPORATION, Tokyo (JP)

(72) Inventors: Shinichiro Tsuda, Basingstoke (GB); Yuxin Wei, Basingstoke (GB); Brian Alexander Martin, Basingstoke (GB); Hideji Wakabayashi, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 123 days.

This patent is subject to a terminal disclaimer.

(21) Appl. No.: 17/543,159

(22) Filed: Dec. 6, 2021

(65) Prior Publication Data

US 2022/0095174 A1 Mar. 24, 2022

Related U.S. Application Data

(63) Continuation of application No. 16/324,173, filed as application No. PCT/EP2017/070518 on Aug. 11, 2017, now Pat. No. 11,197,205.

(30) Foreign Application Priority Data

Aug. 11, 2016 (EP) ..................................... 16183756

(51) Int. Cl.
*H04W 36/00* (2009.01)
*H04W 36/30* (2009.01)
(Continued)

(52) U.S. Cl.
CPC ... *H04W 36/0027* (2013.01); *H04W 36/0069* (2018.08); *H04W 36/00837* (2018.08);
(Continued)

(58) Field of Classification Search
CPC . H04W 36/0027; H04W 76/38; H04W 76/16; H04W 36/00837; H04W 36/0069;
(Continued)

(56) References Cited

U.S. PATENT DOCUMENTS

2006/0056448 A1* 3/2006 Zaki .................. H04W 36/0066
370/466
2006/0276191 A1* 12/2006 Hwang ................. H04W 36/30
455/436

(Continued)

OTHER PUBLICATIONS

3GPP TSG RAN WG3#92, R3-161154 Nanjing, P.R. China, May 23-27, 2016 Source: CATT Title: Considerations on inter-RAT mobility between NR and LTE (Year: 2016).*

(Continued)

*Primary Examiner* — Chi H Pham
*Assistant Examiner* — Weibin Huang
(74) *Attorney, Agent, or Firm* — XSENSUS LLP (57) ABSTRACT

A mobile telecommunications system method is described. A property of a first received reference signal from a first base station operating in a first mobile telecommunications system and a property of a second received reference signal from a second base station or a user equipment operating in a second mobile telecommunications system are measured. It is switched from the first base station to the second base station as a serving base station based on the property of the first received reference signal and on the property of the second received reference signal.

15 Claims, 4 Drawing Sheets

(51) Int. Cl.
  *H04W 76/16* (2018.01)
  *H04W 76/38* (2018.01)
  *H04W 36/08* (2009.01)
  *H04W 36/14* (2009.01)
(52) U.S. Cl.
  CPC ....... *H04W 36/0088* (2013.01); *H04W 36/30* (2013.01); *H04W 76/16* (2018.02); *H04W 76/38* (2018.02); *H04W 36/08* (2013.01); *H04W 36/14* (2013.01)
(58) Field of Classification Search
  CPC . H04W 36/0088; H04W 36/30; H04W 36/08; H04W 36/14
  See application file for complete search history.

(56) References Cited

U.S. PATENT DOCUMENTS

| | | | |
|---|---|---|---|
| 2009/0247164 A1* | 10/2009 | Kandukuri Narayan | H04W 36/30 455/436 |
| 2010/0136978 A1* | 6/2010 | Cho | H04W 36/14 455/441 |
| 2014/0160937 A1* | 6/2014 | Richards | H04W 52/0212 370/329 |
| 2015/0365878 A1 | 12/2015 | Cho et al. | |
| 2016/0044567 A1* | 2/2016 | Baghel | H04M 15/66 370/331 |
| 2016/0242083 A1* | 8/2016 | Guan | A61K 31/506 |
| 2018/0288670 A1* | 10/2018 | Li | H04W 36/0009 |

OTHER PUBLICATIONS

KT Corp., "RAN Interworking between NR and LTE", 3GPP TSG-RAN WG2 Meeting No. 93bis R2-162965, Dubrovnik Croatia, Apr. 11-15, 2016, pp. 1-2.
Ericsson, "Tight integration of the New Radio interface (NR) and LTE: Control Plane design", 3GPP TSG-RAN WG2 #93bis Tdoc R2-162753, Dubrovnik Croatia, Apr. 11-15, 2016, pp. 1-5.
3GPP, "Technical Specification Group Radio Access Network; Evolved Universal Terrestrial Radio Access (E-UTRA); Study on Small Cell Enhancements for E-UTRA and E-UTRAN—Higher layer aspects", 3GPP TR 36.842 V0.1.1 Release 12, May 2013, pp. 1-39.
Itri, "Deployment scenario for tight Interworking between NR and LTE", 3GPP TSG-RAN WG2 Meeting No. 94 Tdoc R2-163787, Nanjing China, May 23-27, 2016, pp. 1-3.
Samsung, "Inter-RAT handover with LTE", 3GPP TSG-RAN WG3 Meeting No. 92 R3-161063, Nanjing, P.R. China, May 23-27, 2016, 4 pages.
ZTE, "Interworking Scenarios between NextGen NW and LTE", 3GPP TSG RAN WG3 Meeting No. 92 R3-161102, Nanjing, China, May 23-27, 2016, pp. 1-5.
Huawei, "Inter-RAT handover", 3GPP TSG-RAN3 Meeting No. 92 R3-161140, Nanjing China, May 23-27, 2016, 4 pages.
Catt, "Considerations on inter-RAT mobility between NR and LTE", 3GPP TSG RAN WG3#92 R3-161154, Nanjing, P.R. China, May 23-27, 2016, pp. 1-5.
International Search Report dated Dec. 5, 2017 for PCT/EP2017/070518 filed on Aug. 11, 2017, 11 pages.
ZTE: "Consideration on the Dual RRC for L TE/NR tight interworking", R2-163739, 3rd Generation Partnership Project (3GPP), vol. RAN WG2, Apr. 23, 2016-Apr. 25, 2016 May 13, 2016 (May 13, 2016), XP051095715, Retrieved from the Internet: URL:http://www.3gpp.orgiftp/tsg_ranNVG2_RI.2/TSGR2_94/Docs/ [retrieved on May 13, 2016).
CMCC: "Considerations on control plane for L TE-NR dual connectivity", R2-163708, 3rd Generation Partnership Project (3GPP), RAN WG2, May 23, 2016-May 27, 2016 May 22, 2016 (May 22, 2016), XP051105123, Retrieved from the Internet: URL:http://www.3gpp.org/ftp/Meetings_3GPP _SYNC/RAN2/Docs/ [retrieved on May 22, 2016).
Nokia et al: "Definition of a single and multiple RRC connection", R2-163510 Definition of a Single and Multiple RRC Connections, 3rd Generation Partnership Project (3GPP), vol. RAN WG2, May 23, 2016-May 27, 2016 May 22, 2016 (May 22, 2016), XP051104988, Retrieved from the Internet: URL:http://www.3gpp.org/ftp/Meetings_ 3GPP _SYNC/RAN2/Docs/ [retrieved on May 22, 2016).
Ericsson: "Overview of RRC architecture options for the L TE-NR tight interworking", R2-164005—Overview of RRC Architecture Options for the LTE-NR Tight Interworking, 3rd Generation Partnership Project (3GPP), vol. RAN WG2, May 23, 2016-May 27, 2016 May 22, 2016 (May 22, 2016), XP051105340, Retrieved from the Internet: URL:http://www.3gpp.org/ftp/Meetings_3GPP _SYNC/RAN2/Docs/ [retrieved on May 22, 2016).
European Communication dated Jun. 16, 2020 in European Application No. 17749502.5.

\* cited by examiner

MOBILE TELECOMMUNICATIONS SYSTEM METHOD INCLUDING SWITCHING BETWEEN RADIO RESOURCES BASED ON MEASURED SIGNAL PROPERTIES

CROSS-REFERENCE TO RELATED APPLICATIONS

The present application is a continuation of U.S. application Ser. No. 16/324,173 filed Feb. 8, 2019, which is based on PCT filing PCT/EP2017/070518 filed Aug. 11, 2017, which claims priority to 16183756.2, filed in the European Patent Office on Aug. 11, 2016, the entire contents of each of each are incorporated herein by reference.

TECHNICAL FIELD

The present disclosure generally pertains to a mobile telecommunications system method.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems (NR). A NR can be based on LTE technology, just as LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies.

LTE is standardized under the control of 3GPP ("3rd Generation Partnership Project") and there exists a successor LTE-A (LTE Advanced) allowing higher data rates than the basic LTE and which is also standardized under the control of 3GPP.

For the future, 3GPP plans to further develop LTE-A such that it will be able to fulfill the technical requirements of 5G.

As the 5G system will be based on LTE or LTE-A, respectively, it is assumed that specific requirements of the 5G technologies will, basically, be dealt with by features and methods which are already defined in the LTE and LTE-A standard documentation.

5G technologies will allow a concept of a so called "virtual cell" or "local cell" or the like, which may also be based on NR. In this concept a cell is served by a user equipment (UE), e.g. a mobile phone, a computer, tablet, tablet personal computer or the like including a mobile communication interface, or any other device which is able to perform a mobile telecommunication via, for example, LTE(-A), such as a hot spot device with a mobile communication interface. In short, the UE works dynamically as an intermediate node for establishing an indirect network connection between other UEs in the vicinity of the virtual cell or local cell and the network, and/or as an intermediate node between UEs. A function of the intermediate node on the UE may also be carried out by "virtualization". A virtual cell or local cell may communicate with UEs in unlicensed, shared licensed or licensed bands, and it backhauls to network preferably in licensed bands.

A logical separation between control plane and user plane has been done in accordance with the introduction of the IP Multimedia System (IMS) for LTE, and a physical separation between control plane and user plane has been proposed as a possible solution for 5G. Since requirements for the control plane are, for example, robustness and wide coverage so as to maintain the service continuity, a macro or anchor base station should provide a link of the control plane. On the other hand, a key performance of the user plane is the efficient spectrum usage in order to improve the cell capacity. However, since the requirements of the user plane are highly depending on specific use case or UE capability/category, a variety of types of reception/transmission or routing methods are considered according to the respective use case or UE capability/category taking into account a concept for 5G such as "network slicing".

For the 5G technologies, it is envisaged that a UE or other NR stations in the function as a virtual cell, local cell, micro or pico cell or the like should be able to take over responsibilities, which are typically done, for example, in a base station, or eNodeB (Evolved Node B) as it is called in LTE (the eNodeB is the element in the evolved UTRA of LTE, the UTRA being the UMTS Terrestrial Radio Access). Such responsibilities which are envisaged to be performed in the UE as a virtual cell or the other NR stations or entities mentioned above, are, for example, radio resource management, radio resource control (RRC) connection control, etc.

In 5G, there are in general two operational modes, the tight interworking mode and standalone mode. In the tight interworking mode, a 5G NR eNodeB should work together with a LTE eNodeB, e.g. via dual connectivity or carrier aggregation. The LTE eNodeB will work as an anchor eNodeB for the 5G NR eNodeB. In a standalone mode, the 5G NR eNodeB could work independent from the assistance of the LTE eNodeB.

In 3GPP document R2-162965, "RAN interworking between NR and LTE", 3GPP TSG-RAN WG2 Meeting #93bis, Dubrovnik, Croatia, 11-15 Apr. 2016, a protocol architecture of 5G user and control planes are presented. In this architecture, control signaling of NR RAN (Radio Access Network) is transferred via LTE data bearer, which could re-use existing LTE procedures with minimized modifications.

In 3GPP document R2-162753, "Tight integration of the New Radio interface (NR) and LTE: Control Plane design", 3GPP TSG-RAN WG2 #93bis, Dubrovnik, Croatia, 11-15 Apr. 2016, a dual RRC is proposed in which two separate RRC entities, e.g. LTE eNodeB and NR eNodeB, can generate RRC messages to the UE. Control-plane diversity can be provided by means of PDCP (Packet Data Convergence Protocol) level split and combining. Local configuration of lower layers is possible. The coordination of RRM (Radio Resource Management) functions between NR and LTE RATs may be required.

Furthermore, RRC diversity was proposed in Rel-12 dual connectivity. It was proposed to enhance the handover performance. In 3GPP document TR 36.842, "3rd Generation Partnership Project; Technical Specification Group Radio Access Network; Study on Small Cell enhancements for E-UTRA and E-UTRAN; Higher layer aspects (Release 12)", with RRC diversity, the handover related RRC signaling could additionally be transmitted from or to a potential target cell. Radio link failure (RLF) could in this case be prevented as long as the UE is able to maintain a connection to at least one of the cells.

Although there exist signaling techniques for the future 5G technology, it is generally desirable to improve the signaling.

SUMMARY

According to a first aspect, the disclosure provides a mobile telecommunications system method comprising measuring a property of a first received reference signal from a first base station operating in a first mobile telecommunications system; measuring a property of a second received reference signal from a second base station or a user equipment operating in a second mobile telecommunications system; and switching from the first base station to the second base station as a serving base station based on the property of the first received reference signal and on the property of the second received reference signal.

According to a second aspect, the disclosure provides a mobile telecommunications system method, wherein a connection of a user equipment to a first base station operating in a first mobile telecommunications system is established, wherein a first radio resource control function specified in the first mobile telecommunications system provides signaling related to radio resource control via the connection to the first base station, the method comprising measuring a property of a received reference signal from a second base station or the user equipment operating in a second mobile telecommunications system; and the first radio resource control function establishing a connection to the second base station in addition to the connection to the first base station.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
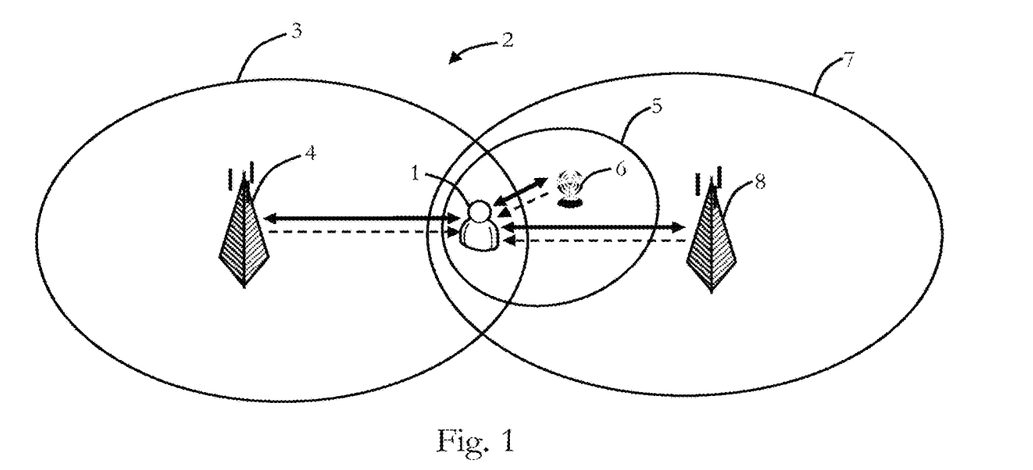
FIG. 1 illustrates a user equipment in a radio access network comprising a first base station operating in a first mobile telecommunications system, a second base station operating in a second mobile telecommunications system, and a third base station operating in the first mobile telecommunications system.

Before a detailed description of the embodiments under reference of FIG. 1 is given, general explanations are made.

As mentioned in the outset, in general, several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems (NR). A NR can be based on LTE technology, just as LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies.

LTE is standardized under the control of 3GPP ("3rd Generation Partnership Project") and there exists a successor LTE-A (LTE Advanced) allowing higher data rates than the basic LTE and which is also standardized under the control of 3GPP.

For the future, 3GPP plans to further develop LTE-A such that it will be able to fulfill the technical requirements of 5G.

As the 5G system will be based on LTE or LTE-A, respectively, it is assumed that specific requirements of the 5G technologies will, basically, be dealt with by features and methods which are already defined in the LTE and LTE-A standard documentation.

5G technologies will allow a concept of a so called "virtual cell" or "local cell" or the like, which may also be based on NR. In this concept a cell is served by a user equipment (UE), e.g. a mobile phone, a computer, tablet, tablet personal computer or the like including a mobile communication interface, or any other device which is able to perform a mobile telecommunication via, for example, LTE(-A), such as a hot spot device with a mobile communication interface. In short, the UE works dynamically as an intermediate node for establishing an indirect network connection between other UEs in the vicinity of the virtual cell or local cell and the network, and/or as an intermediate node between UEs. A function of the intermediate node on the UE may also be carried out by "virtualization". A virtual cell or local cell may communicate with UEs in unlicensed, shared licensed or licensed bands, and it backhauls to network preferably in licensed bands.

A logical separation between control plane and user plane has been done in accordance with introduction of the IP Multimedia System (IMS) for LTE, and a physical separation between control plane and user plane has been proposed as a possible solution for 5G. Since requirements for the control plane can be, for example, robustness and wide coverage so as to maintain the service continuity, a macro or anchor base station should provide a link of the control plane. On the other hand, a key performance of the user plane is the efficient spectrum usage in order to improve the cell capacity. However, since the requirements of the user plane are highly depending on specific use case or UE capability/category, a variety of types of reception/transmission or routing methods are considered according to the respective use case or UE capability/category taking into account a concept for 5G such as "network slicing".

For the 5G technologies, it is envisaged that a UE or other NR stations or entities in the function as a virtual cell, local cell, micro or pico cell, Transmission/Reception Point (TRP) or the like should be able to take over responsibilities, which are typically done, for example, in a base station, or eNodeB (Evolved Node B) as it is called in LTE (the eNodeB is the element in the evolved UTRA of LTE, the UTRA being the UMTS Terrestrial Radio Access). Such responsibilities which are envisaged to be performed in the UE as a virtual cell or the other NR stations or entities mentioned above, are, for example, radio resource management, radio resource control (RRC) connection control, etc.

In 5G, there are in general two operational modes, which may also be implemented in embodiments of the present disclosure, the tight interworking mode and standalone mode. In the tight interworking mode, a 5G NR eNodeB should work together with a LTE eNodeB, e.g. via dual connectivity or carrier aggregation. The LTE eNodeB may work as an anchor eNodeB for the 5G NR eNodeB. In a standalone mode, the 5G NR eNodeB could work independent from the assistance of the LTE eNodeB.

In 3GPP document R2-162965, "RAN interworking between NR and LTE", 3GPP TSG-RAN WG2 Meeting #93bis, Dubrovnik, Croatia, 11-15 Apr. 2016, a protocol architecture of 5G user and control planes are presented. In this architecture, control signaling of NR RAN (Radio Access Network) is transferred via LTE data bearer, which could re-use existing LTE procedures with minimized modifications.

In 3GPP document R2-162753, "Tight integration of the New Radio interface (NR) and LTE: Control Plane design", 3GPP TSG-RAN WG2 #93bis, Dubrovnik, Croatia, 11-15 Apr. 2016, a dual RRC is proposed in which two separate RRC entities, e.g. LTE eNodeB and NR eNodeB, can generate RRC messages to the UE. Control-plane diversity can be provided by means of PDCP (Packet Data Convergence Protocol) level split and combining. Local configuration of lower layers is possible. The coordination of RRM (Radio Resource Management) functions between NR and LTE RATs may be required in some embodiments.

Furthermore, RRC diversity was proposed in Rel-12 dual connectivity. It was proposed to enhance the handover performance. In 3GPP document TR 36.842, "3rd Generation Partnership Project; Technical Specification Group Radio Access Network; Study on Small Cell enhancements for E-UTRA and E-UTRAN; Higher layer aspects (Release 12)", with RRC diversity, the handover related RRC signaling could additionally be transmitted from or to a potential target cell. Radio link failure (RLF) could, in this case, be prevented as long as the UE is able to maintain a connection to at least one of the cells.

The RRC diversity may apply to other dedicated signaling besides handover command and, thus, in some embodiments, a dual RRC performance may be enhanced by taking into account deployment of NR eNodeB and usage of higher frequency such as mmWave.

As mentioned, the new Radio Access Technology (RAT) developed for 5G, called New Radio (NR), may be used in local cells and virtual cells in some embodiments, but there may also be small cells provided by NR eNodeBs and may be TRPs.

In some embodiments, a first and second operational mode is provided for the 5G system.

The first operational mode is called "standalone mode" hereinafter. In the standalone mode, the UE is connected to a single base station or eNodeB, using LTE or NR.

The second operational mode is called "tight interworking mode" hereinafter. In the tight interworking mode, a part of the mobile telecommunications system functionality is provided by a first base station, and another part of the mobile telecommunications system functionality is provided by a second base station, whereby the two base stations can be operating in different mobile telecommunications systems.

For example, in some embodiments, the UE receiving and transmitting user data over NR may take advantage of increased speed and reduced connection management communication overhead of a NR small cell or TRP.

However, NR connections may not be as stable as LTE connections in some instances and may fail, for instance, if the UE moves out of the NR cell too fast to perform a handover to a neighboring radio cell.

Therefore, an RRC connection to a LTE eNodeB can be upheld in addition to the NR connection. In case of failure of the NR connection, the data transfer can thereby be quickly continued between the LTE eNodeB and the UE.

In LTE, RRC states in UE were simplified to be RRC IDLE or RRC CONNECTED, which is different to the UE of UMTS which had 4 states, such as URA PCH, CELL PCH, CELL FACH and CELL DCH. Furthermore, in LTE a hard handover was introduced so that the UE always connects to a single cell only and the switching of a UE's connection from a source cell to a target cell does not involve simultaneous communication with multiple cells as it is known from UMTS which defines an active set for providing a diversity effect by soft handover.

Due to the envisaged separation of control-plane and user-plane and the envisaged dual connectivity with both LTE cell and NR cell in NR, some embodiments provide a robust RRC connection in dual connectivity which may reduce a possibility of handover failure, link failure or the like.

It has been recognized that robust methods are needed, in some embodiments, for triggering a transition between standalone and tight interworking mode, and for establishing dual connectivity, for example, in the tight interworking mode.

In the case that a mobile network operator (MNO) serves both a LTE eNodeB and a NR eNodeB, the NR cell could mostly be located within the coverage of the LTE eNodeB. Then, the LTE RRC entity, which provides LTE RRC functionality via the LTE eNodeB, can work as an RRC anchor (may also be referred to as anchor base station). Here, the LTE RRC entity may exchange RRC messages related to LTE RRC functionality via the LTE eNodeB with the UE.

This may enhance stability in some embodiments, since the LTE eNodeB may provide a relatively large coverage, as well as a dual connectivity for LTE.

Then, a handover is performed based on LTE for a moving UE, and the RRC anchor manages addition or release of a NR cell depending on the coverage of the NR cell.

However, in some cases a LTE eNodeB and a NR eNodeB may be operated by different MNOs. For example, in a shared unlicensed spectrum or in a localized licensed spectrum such as the 3.5 GHz band with Priority Access in the US, different MNOs may manage NR eNodeBs in a region. As a MNO serving only NR eNodeBs may not have a LTE eNodeB that could be used as an RRC anchor, a short inter-RAT handover from LTE to NR or from NR to LTE may be necessary.

Accordingly, some embodiments of the present disclosure pertain to a mobile telecommunications system method comprising measuring a property of a first received reference signal from a first base station operating in a first mobile telecommunications system; measuring a property of a second received reference signal from a second base station or a user equipment operating in a second mobile telecommunications system; and switching from the first base station to the second base station as a serving base station based on the property of the first received reference signal and on the property of the second received reference signal.

Each of the first and the second mobile telecommunications systems may, for example, be LTE, more advanced versions of LTE such as LTE-A or LTE-B, NR, or the like.

Each of the first and the second base stations operating in the first, respectively, second mobile telecommunications system may be an eNodeB or TRP, or a UE serving as a base station for a virtual cell or local cell. Hence, in principle, a base station may be based on the principles of LTE (LTE-A) and/or it may be based on NR RAT, as also discussed above. The base station may be based on the known eNodeB of LTE, as one example, or it may be based on the discussed NR eNodeB. The user equipment may be, for example, a mobile phone, smartphone, a computer, tablet, tablet personal computer, a wireless modem installed in a vehicle or the like including a mobile communication interface, or any other device which is able to perform a mobile telecommunication via, for example, LTE or NR, such as a hot spot device with a mobile communication interface, etc.

The property of the first and second received reference signal being measured may be, for instance, a reference signal received power (RSRP), a reference signal received quality (RSRQ), or any other quantity indicating a signal quality. Here, the second received reference signal may be measured by the second base station (e.g., NR eNodeB or TRP) when the user equipment operates according to uplink based mobility instead of transmitting the second reference signal from the second base station. In short, the user equipment may transmit the second reference signal according to a strength of the first received reference signal from the first base station (e.g., LTE (LTE-A)).

The method may further comprise switching from a first Radio Resource Control (RRC) function specified in the first mobile telecommunications system to a second RRC function specified in the second mobile telecommunications system.

Each RRC function may handle at least one of a provision of system information, RRC connection control, network controlled inter-RAT mobility, measurement configuration, and measurement reporting.

The method may further comprise the second RRC function establishing a connection to the second base station; and measuring a property of a third received reference signal from a third base station operating in the first mobile telecommunications system.

The second RRC function may further establish a connection to the third base station in addition to the connection to the second base station.

The second RRC function may further provide signaling related to RRC via both connections to the second base station and to the third base station.

The second RRC function may further establish the connection to the third base station based on a first threshold for the property of the third received reference signal.

The second RRC function may further release the connection to the third base station based on a second threshold for the property of the third received reference signal.

The second RRC function may further establish the connection to the third base station in addition to the connection to the second base station, when an operating frequency of the second base station is higher than a preconfigured/predefined value or higher than a value, which is configured by the first RRC function or the second RRC function.

The user equipment and/or the second RRC function may further release the connection to the third base station in accordance with expiration of a timer. The duration of the timer may be predetermined by the second and/or third base station. The timer may be predetermined before start of the timer or, in some embodiments, the duration of the timer may be set or amended even after activation of the timer.

Some embodiments of the present disclosure pertain to a mobile telecommunications system method, wherein a connection of a user equipment to a first base station operating in a first mobile telecommunications system is established, wherein a first radio resource control function specified in the first mobile telecommunications system provides signaling related to RRC via the connection to the first base station, the method comprising: measuring a property of a received reference signal from a second base station or the user equipment operating in a second mobile telecommunications system; and the first RRC function establishing a connection to the second base station in addition to the connection to the first base station.

As mentioned, each of the first and the second mobile telecommunications systems may, for example, be LTE, more advanced versions of LTE such as LTE-A or LTE-B, NR, or the like, and each of the first and the second base stations operating in the first, respectively, second mobile telecommunications system may be an eNodeB or TRP, or a UE serving as a base station for a virtual cell or local cell.

The property of the first and second received reference signal being measured may be, for instance, a RSRP, a RSRQ, or any other quantity indicating a signal quality, as mentioned above.

The first RRC function may handle at least one of a provision of system information, RRC connection control, network controlled inter-RAT mobility, measurement configuration, and measurement reporting, as mentioned above.

The method may further comprise shifting, based on a threshold for the property of the received reference signal, to a second RRC function specified in the second mobile telecommunications system at least one of a provision of system information, RRC connection control, network controlled inter-RAT mobility, measurement configuration, and measurement reporting handled by the first RRC function, wherein the second RRC function provides signaling related to RRC via the connection to the second base station.

The method may further comprise detecting a mobility state of a user equipment; and shifting, when the mobility state meets a preconfigured/predetermined condition or meets a condition, which is configured by the first RRC function, to the second RRC function specified in the second mobile telecommunications system at least one of the provision of system information, RRC connection control, network controlled inter-RAT mobility, measurement configuration, and measurement reporting handled by the first RRC function.

Some embodiments are based on the following tight interworking assumption: A LTE (RRC) anchor entity, e.g. anchor base station as discussed above, has both a control-plane and a user-plane connection with the evolved packet core (EPC) while the NR entity has only a user-plane connection, if any, with the EPC. For other tight interworking embodiments, e.g. NR anchor entity has both a control-plane and a user-plane connection with the next generation core network (NextGenCore) while the LTE entity has only a user-plane connection, if any, with the NextGenCore. In such embodiments, the basic principles are applicable mutatis mutandis with differences on the transmitted control signaling in each entity as will be apparent to the skilled person.

The methods as described herein are also implemented in some embodiments as a computer program causing a computer and/or a processor to perform the method, when being carried out on the computer and/or processor and/or circuitry of a base station or user equipment. In some embodiments, also a non-transitory computer-readable recording medium is provided that stores therein a computer program product, which, when executed by a processor/circuitry, causes the methods described herein to be performed.

Returning to FIG. 1, there is illustrated a UE 1 in a radio access network (RAN) 2.

The RAN 2 has a first radio cell 3 provided by a first base station 4. The first base station 4 is a LTE eNodeB. However, in another embodiment, it can operate in LTE-A, LTE-B, or any other mobile telecommunications system.

The RAN 2 further has a second radio cell 5 provided by a second base station 6, which is, in the example illustrated here, a NR eNodeB or TRP, but it can, in another embodiment, also be another UE providing a local cell or a virtual cell, or even operate in any other mobile telecommunications system.

The UE 1 is located in the first radio cell 3 and holds a data connection to the LTE eNodeB 4, as indicated by the bold arrow between the UE 1 and the LTE eNodeB 4. Moreover, the UE 1 is provided with signaling related to RRC by a first RRC function specified in LTE, as indicated by the dashed arrow between the UE 1 and the LTE eNodeB 4.

As the UE 1 moves into the edge region of the LTE cell 3, it enters the reception area of the NR cell 5.

The UE 1 receives reference signals sent by the LTE eNodeB 4 and by the NR eNodeB 6. By measuring a property of the reference signals, such as a RSRP, a RSRQ, or another quantity indicating signal quality, and comparing the property measured for the reference signals, the UE 1 may determine that the NR coverage is good enough to establish a connection to the NR eNodeB 6.

It may be desirable that the UE 1 holds a data connection to the NR eNodeB 6 instead of to the LTE eNodeB 4 because then the LTE eNodeB 4, which serves a larger area and thus more UEs than the NR eNodeB 6, is relieved, and because the data transfer rate is higher in NR than in LTE.

There may also be cases when an RRC anchor has to be shifted from a LTE RRC entity to a NR RRC entity, depending on a RSRP and/or a RSRQ of the LTE eNodeB 4 and the NR eNodeB 6. It may then be desirable that the NR standalone operation is enabled by the NR RRC entity. Here, the NR RRC entity may exchange RRC messages related to NR RRC functionality via the NR eNodeB 6 with the UE 1.

An efficient way for switching from a connection provided by a first base station to a connection provided by a second base station is a procedure called handover. A handover is coordinated over the RRC protocol. A handover between different mobile telecommunications systems, such as, in the case of FIG. 1, a handover from LTE to NR, is called inter-RAT handover and involves RRC functionality of both the source base station and the target base station.

Therefore, to establish a connection to the NR eNodeB 6, the UE 1 switches from the RRC function specified in LTE to a second RRC function specified in NR, which is provided by the NR eNodeB 6, as indicated by the dashed arrow between the UE 1 and the NR eNodeB 6.

The RRC functionality provided by the RRC functions may include a provision of system information, RRC connection control, network controlled inter-RAT mobility, measurement configuration, and/or measurement reporting.

RRC connection control may include establishment, modification, and release of a RRC connection, including paging; initial security activation; establishment of Signaling Radio Bearers (SRBs) and Data Radio Bearers (DRBs) for carrying user data; handover within LTE including transfer of UE RRC context information such as the radio resource configuration including local settings, UE capabilities, and radio resource management information; configuration of the lower protocol layers such as Packet Data Convergence Protocol (PDCP), Radio Link Control (RLC), Media Access Control (MAC), the physical layer, and so on; access class barring; and/or radio link failure.

Network-controlled inter-RAT mobility may include handover, cell change orders and redirection upon connection release, security activation, and transfer of UE RRC context information.

Measurement configuration and measurement reporting may include configuration and activation of measurement gaps, for example for intra-frequency mobility, inter-frequency mobility, and/or inter-RAT mobility.

Further RRC functionality may include a transfer of dedicated NAS information or a transfer of UE radio access capability information or the like.

The second RRC function then establishes a connection between the UE 1 and the NR eNodeB 6, indicated by the bold arrow between the UE 1 and the NR eNodeB 6.

When the connection to the NR eNodeB 6 has been established and all RRC functionality has been shifted to the second RRC function, the inter-RAT handover is completed and the UE 1 is connected to the NR eNodeB 6 in standalone mode.

However, as the NR eNodeB 6 may operate at a higher frequency than LTE, such as mmWave, the possibility of failure of an inter-RAT handover may be higher than for an intra-RAT handover in a LTE system, because the link quality of NR might drop suddenly.

The possibility of handover failure may be reduced by establishing dual connectivity with a NR eNodeB and a LTE eNodeB for RRC diversity, whereby support from another MNO managing a LTE eNodeB may be received even after the RRC anchor was shifted to a NR RRC entity, for example similar to the mobile virtual network operator (MVNO) scheme. Here, this RRC diversity may enable the NR RRC entity to exchange any RRC messages via both the NR eNodeB and the LTE eNodeB with the UE 1.

In the embodiment of FIG. 1, the UE 1 is located in a LTE cell 7 provided by a LTE eNodeB 8. Dual connectivity may be established by a connection to the LTE eNodeB 8.

The connection with the LTE eNodeB 8 may support only diversity of a RRC connection between the UE 1 and the NR RRC entity on the basis of the NR RRC entity, and may support only an RRC connection control function for link failure of the NR eNodeB 6 (including handover failure upon handover to target cell such as the NR eNodeB 6). Here, the NR RRC entity may exchange RRC messages related to the RRC connection control function for link failure via the LTE eNodeB 8 with the UE 1.

For establishing RRC diversity, the UE 1 may receive a reference signal from the LTE eNodeB 8 and measure a property of the reference signal from the LTE eNodeB 8, such as a RSRP, a RSRQ, or any other quantity indicating signal quality.

Based on the measured property of the reference signal, the second RRC function may establish a RRC connection to the LTE eNodeB 8, as indicated by the dashed arrow between the UE 1 and the LTE eNodeB 8.

After that, the UE 1 holds a RRC connection to both the NR eNodeB 6 and the LTE eNodeB 8, as indicated by the bold arrow between the UE 1 and the LTE eNodeB 8, and RRC diversity with the NR eNodeB 6 and the LTE eNodeB 8 is established.

Furthermore, the UE 1 or the NR eNodeB 6 may trigger to establish the connection with the LTE eNodeB 8 for diversity of the NR RRC connection when the link quality is worse than a first predetermined or configured threshold.

On the other hand, when the quality of the link between the UE 1 and the NR eNodeB 6 is better than a second predetermined or configured threshold, the UE 1 or the NR eNodeB 6 may trigger to release the connection with the LTE eNodeB 8 established for RRC diversity.

Furthermore the UE 1 or the NR eNodeB 6 may trigger to release the connection with the LTE eNodeB 8 established for RRC diversity in accordance with expiration of a timer of which duration may be preconfigured/predetermined or configured by the NR eNodeB 6 or the LTE eNodeB 8. The timer may be implemented in the UE 1 or the NR eNodeB 6 and may start or reset in accordance with establishment of the connection with the LTE eNodeB 8.

If NR is specified to transmit a cell specific or a similar type of reference signal in downlink, the link quality may be given as RSRP/RSRQ. Otherwise, the NR eNodeB 6 may use any type of signal transmitted from the UE 1 in uplink (for example a sounding reference signal) for enabling the network to select a TRP (Transmission/Reception Point) including NR eNodeBs, configuring beamforming, or the like.

Furthermore, a LTE RRC entity may configure measurement configuration and reporting for LTE and NR respectively, and the NR RRC entity may take over the role of configuring measurement configuration and reporting for NR after shifting this RRC function to the NR RRC entity. Here the connection with the LTE eNodeB 8 may support not only RRC connection control function for failure of the link to the NR eNodeB 6, but may also support provision of system information, measurement configuration and reporting for handover, and a network-controlled inter-RAT mobility function.

Figure 2:
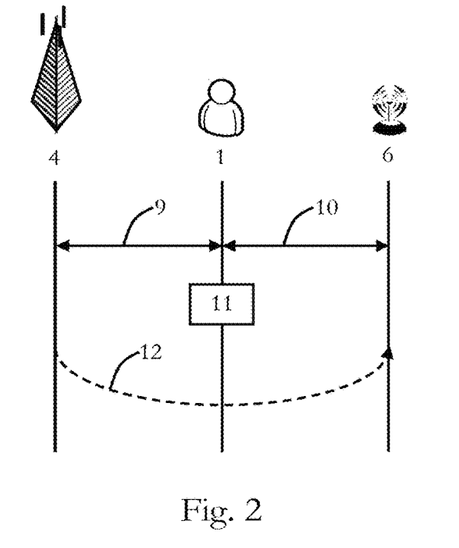
FIG. 2 shows a flowchart of a method for a dynamic shift of a RRC function in NR standalone operation.

Furthermore, the above RRC diversity may be triggered depending on the operation band of the NR eNodeB 6, because a higher frequency causes a higher possibility to face link failure. FIG. 2 shows a flowchart of a mobile telecommunications system method for a dynamic shift of a RRC function to NR standalone operation.

The method illustrated in FIG. 2 first performs a measurement 9 of a property of a reference signal received by a UE 1 from a LTE eNodeB 4 and a measurement 10 of a property of a reference signal received by the UE 1 from a NR eNodeB 6. However, in other embodiments, other mobile telecommunications systems than LTE and NR may be involved such as, for example, LTE-A or LTE-B.

The property of the reference signals measured by the UE 1 may be, for example, a RSRP, a RSRQ, or any other quantity indicating signal quality.

At 11, the UE 1 determines, based on the measured property of the reference signals, whether or not to switch from a connection to the LTE eNodeB 4 to a connection to the NR eNodeB 6.

If the UE 1 determines to switch to a connection to the NR eNodeB 6, the method further comprises at 12 of the UE 1 switching an RRC functionality from the LTE eNodeB 4 to the NR eNodeB 6. The RRC functionality may include, for example, a provision of system information, RRC connection control, network controlled inter-RAT mobility, measurement configuration, and/or measurement reporting.

Figure 3:
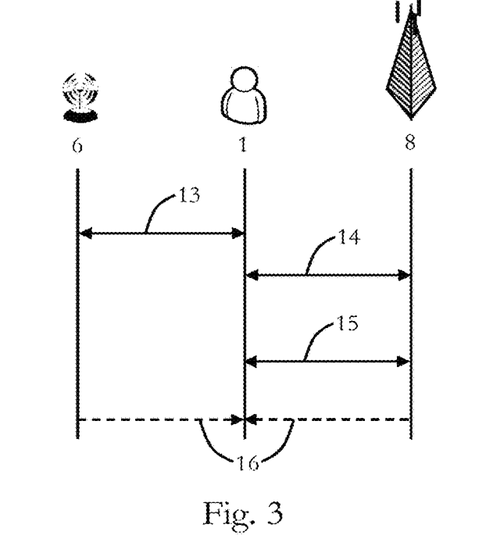
FIG. 3 shows a flowchart of a method for a diversity of a RRC function in dual connectivity operation.

FIG. 3 shows a flowchart of a mobile telecommunications system method for establishing diversity of an RRC function in a dual connectivity operation.

At 13, a RRC function establishes a connection between a UE 1 and a base station operating in a mobile telecommunications system (e.g. RAN 2 of FIG. 1), such as, for example, a NR eNodeB 6.

The UE 1 measures, at 14, a property of a reference signal sent from a base station operating in another mobile telecommunications system such as, in the case of FIG. 3, from a LTE eNodeB 8.

At 15, the RRC function establishes a connection to the LTE eNodeB 8.

At 16 the RRC function provides the UE 1 with RRC functionality via both the NR eNodeB 6 and the LTE eNodeB 8.

Figure 4:
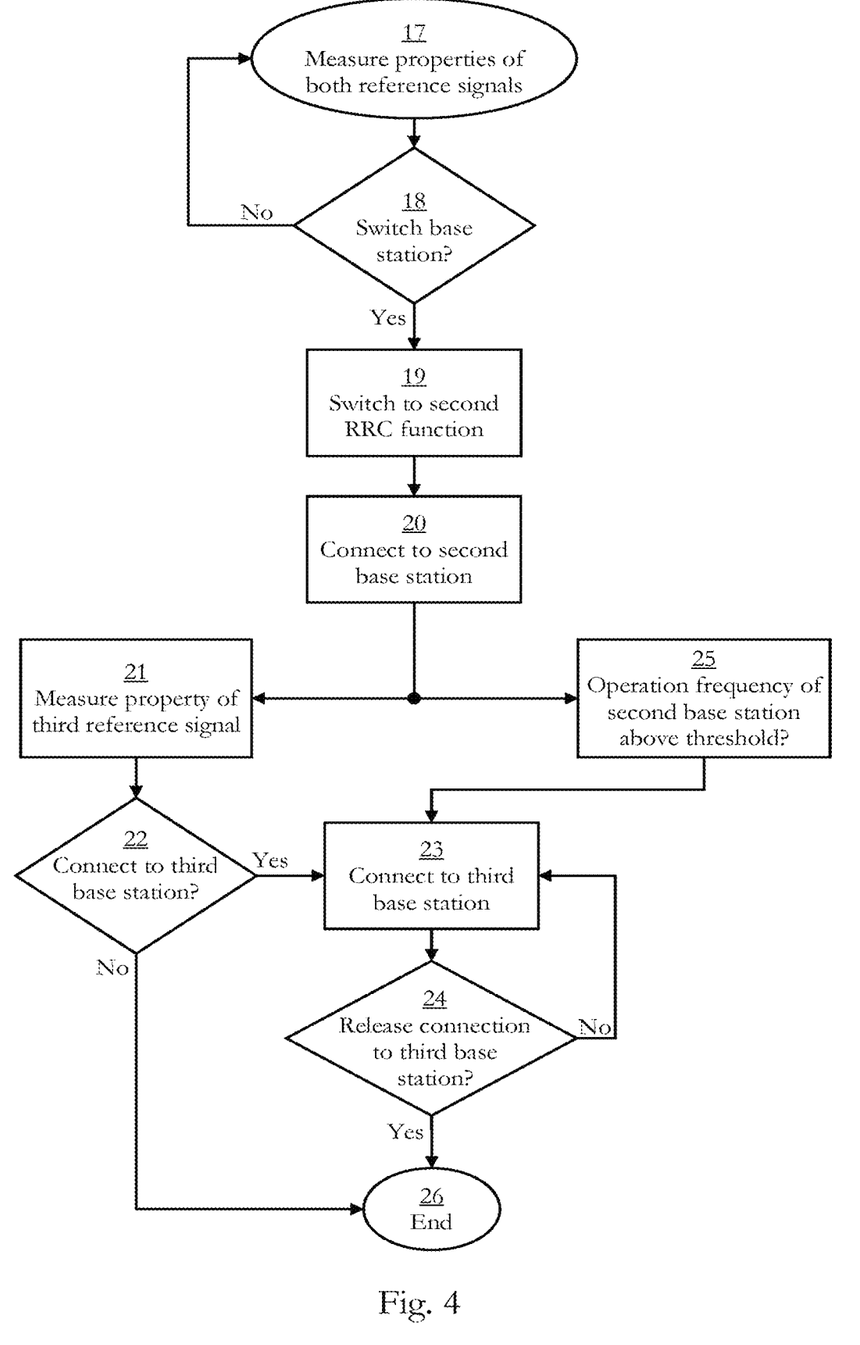
FIG. 4 shows a flowchart of a method for a dynamic shift of a RRC function in NR standalone operation and in dual connectivity operation.

FIG. 4 shows a flowchart of a mobile telecommunications system method for a dynamic shift of a RRC function in NR standalone operation and for establishing RRC diversity.

At 17, a UE, such as UE 1, measures a property of two reference signals received from a first base station operating in a first mobile telecommunications system such as, for example, a LTE eNodeB 4, and from a second base station operating in a second mobile telecommunications system such as, for example, a NR eNodeB 6, respectively.

The property of the reference signals may be, for example, a RSRP, a RSRQ, or any other quantity suitable for determining a signal quality.

At 18, a decision is made, based on the measured property of the reference signals, whether the UE 1 should switch from the LTE eNodeB 4 as a serving base station to the NR eNodeB 6.

The decision can be made by the UE 1 or by an RRC function specified in a mobile telecommunications system to which the UE 1 connected, such as LTE in the current embodiment.

If the decision is to not switch to the second base station, the method can, for example, repeat 17, e.g. at a later time.

If the decision is to switch to the second base station, at 19 it is switched from a first RRC function specified in the first telecommunications system, such as LTE, to a second RRC function specified in the second mobile telecommunications system, which is NR in this embodiment.

The RRC functions may handle, for example, a provision of system information, RRC connection control, network controlled inter-RAT mobility, measurement configuration, and/or measurement reporting.

At 20, the second RRC function establishes a connection to the second base station 6.

To establish dual connectivity and RRC diversity, at 21 a property of a third reference signal is measured, which is received by the UE 1 from a third base station operating in the first mobile telecommunications system, for example from a LTE eNodeB 8. This measured property may be, for example, a RSRP, a RSRQ, or any other quantity that is suitable for determining a signal quality.

At 22, the UE 1 or the second RRC function decides, whether or not to establish a connection to the third base station 8, for example, by comparing the measured property with a first threshold.

If the third base station 8 does not send a reference signal, the second RRC function may use any information sent by the UE 1, such as, for example, a sounding reference signal, to determine whether to establish a connection to the third base station 8.

If the decision is to connect to the third base station 8, the second RRC function establishes a connection between the UE 1 and the LTE eNodeB 8 at 23.

When the UE 1 is connected to the LTE eNodeB 8, the second RRC function may release the connection to the LTE eNodeB 8 at 24, based on a comparison of the measured property of the reference signal sent by the LTE eNodeB 8 with a second threshold. If the second RRC function decides not to release the connection to the LTE eNodeB 8, the connection is upheld.

Another criterion for establishing a connection to the LTE eNodeB 8 may be checked at 25 independent from a reference signal. The RRC function may decide to establish a connection to the LTE eNodeB 8 based on a third threshold for the operation frequency of the second base station 6, which may be preconfigured/predetermined or configured, for instance, by the first or second RRC function. For example, a connection between the UE 1 and the LTE eNodeB 8 may be triggered, if the operating frequency of the NR eNodeB 6 is higher than the third threshold.

This may provide NR connections which may be less robust and which may have a smaller operating range for higher frequencies than LTE connections.

If the operation frequency of the NR eNodeB 6 is higher than the third threshold, the RRC function may also perform 23 and establishes a connection between the UE 1 and the LTE eNodeB 8.

The end 26 of the method may be reached, if the second RRC function releases the connection at 24, or if at 22 it is decided to not connect to the LTE eNodeB 8.

Figure 5:
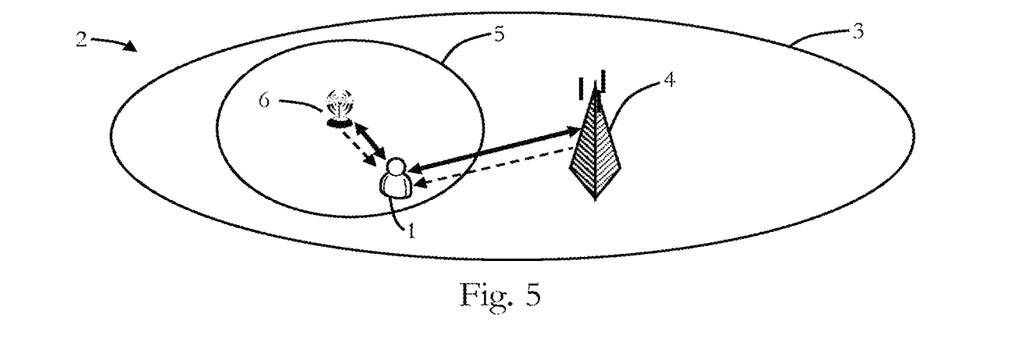
FIG. 5 illustrates a user equipment in a radio access network comprising a first base station operating in a first mobile telecommunications system and a second base station operating in a second mobile telecommunications system.

FIG. 5 illustrates a UE 1 in a RAN 2 having a first base station 4 operating in a first mobile telecommunications system and a second base station 6 operating in a second mobile telecommunications system.

In the present embodiment, the first mobile telecommunications system is LTE, and the first base station 4 is a LTE eNodeB. However, in another embodiment, the first mobile telecommunications system can be any other mobile telecommunications system, for example LTE-A, LTE-B, or the like.

The second mobile telecommunications system is NR in this embodiment, but in another example the second mobile telecommunications system can be any other suitable mobile telecommunications system, such as LTE. Accordingly, the second base station 6 is a NR eNodeB.

In the embodiment of FIG. 5, the UE 1 is located in a LTE cell 3 established by the LTE eNodeB 4 and holds a connection to the LTE eNodeB 4, which is indicated by the bold arrow between the UE 1 and the LTE eNodeB 4. A first RRC function provides RRC functionality to the UE 1 via the LTE eNodeB 4, as indicated by the dashed arrow between the UE 1 and the LTE eNodeB 4.

The RRC functionality may include a provision of system information, RRC connection control, network controlled inter-RAT mobility, measurement configuration, and/or measurement reporting.

When the UE 1 is in the coverage of a NR cell 5 established by the NR eNodeB 6, the UE 1 may measure a property of a reference signal received from the NR eNodeB 6, wherein the property can be a RSRP, a RSRQ, or any other quantity indicating a signal quality. Here, the coverage of the NR cell 5 may include coverage of TRPs belonging to the NR eNodeB 6 and the coverage of TRPs may be configured based on the signal quality of a reference signal measured by TRPs, which is transmitted from the UE 1. Furthermore the coverage of TRPs may be configured in a beamforming manner.

The UE 1 or the first RRC function may decide, for example, based on the measured property of the reference signal, to establish dual connectivity by establishing a connection between the UE 1 and the NR eNodeB 6, which is illustrated in FIG. 5 by the bold arrow between the UE 1 and the NR eNodeB 6.

If a LTE based handover is performed, whereby a LTE RRC entity adds or releases a NR cell, some or all RRC functionality provided to the UE 1 may be shifted from the first RRC function to a second RRC function specified in NR, which means in this embodiment that a dual RRC architecture is established. The second RRC function may provide the UE 1 with RRC functionality via the NR eNodeB 6, which is indicated by the dashed arrow between the UE 1 and the NR eNodeB 6, or via both the NR eNodeB 6 and the LTE eNodeB 4. Here, the LTE RRC entity may exchange RRC messages related to RRC functionality of the first RRC function via the LTE eNodeB 4 with the UE 1 and the NR RRC entity may exchange RRC messages related to RRC functionality of the second RRC function via the NR eNodeB 6, or both the NR eNodeB 6 and the LTE eNodeB 4 (i.e. in RRC diversity manner in this embodiment) with UE 1.

The decision whether or not to establish RRC diversity may be based on a mobility state of the UE 1, a priority of information of data and signaling, or a duration of stay in the coverage of the NR eNodeB 6, so that an efficient scheme on maintenance of robustness can be managed depending on an importance of data and signaling. Furthermore, proximity RRC signaling can reduce power consumption for signaling.

For example, there may be a low priority signaling radio bearer (SRB), such as, for example, the low priority NAS SRB specified in LTE, and/or a high priority SRB. It may also be expected to introduce a vehicle-to-everything (V2X) SRB and a non-V2X SRB, which may have suitable priorities.

Or, for example, if the network, e.g. an eNodeB or RRC entity, judges that the UE 1 has stayed in the coverage of the NR eNodeB 6 for a predetermined or configured time period, which may e.g. be measured by counting a timer, some or all RRC functionality provided to the UE 1 may be shifted from the first RRC function to the second RRC function.

Or if, for example, the UE 1 is moving out of the coverage of the NR eNodeB 6 into, for example, the coverage of another NR cell, possibly having a relatively high mobility, RRC functionality may be provided by the LTE RRC entity and should not be shifted to the NR RRC entity due to an increasing overhead and an increasing risk of losing the RRC connection.

In both cases, if the UE 1 stays in the NR cell 5 and if the UE 1 moves out of the NR cell 5, the LTE eNodeB 4 may operate as an RRC anchor in a similar manner as in a LTE based handover.

Here, RRC diversity, which includes transmitting any messages from/to the NR RRC entity via both the LTE eNodeB 4 and NR eNodeB 6, may be configured during a preconfigured/predetermined period or a period configured by the network after triggering the shift of RRC functions. Furthermore, a duration of RRC diversity can be configured depending on the mobility state of the UE 1, on a priority of information of data and signaling, or the like.

Due to the possibility of a sudden drop of NR link quality at higher frequencies such as mmWave, a dual RRC operation may be meaningful to recover link failure quickly in cooperation with the LTE RRC entity. Therefore, the LTE RRC entity may keep some of the RRC functionality, for example for link failure.

Whether the LTE RRC entity keeps some function of RRC or not, may be decided depending on the operation band. In addition to duration, the quality of the link to the NR eNodeB 6 may be also taken into account for the decision of shifting some or all RRC functions from the LTE RRC entity to the NR RRC entity.

The RRC functionality candidates for shifting include, for example, system information transmission, RRC connection control, mobility handling, measurement configuration, and the like.

Figure 6:
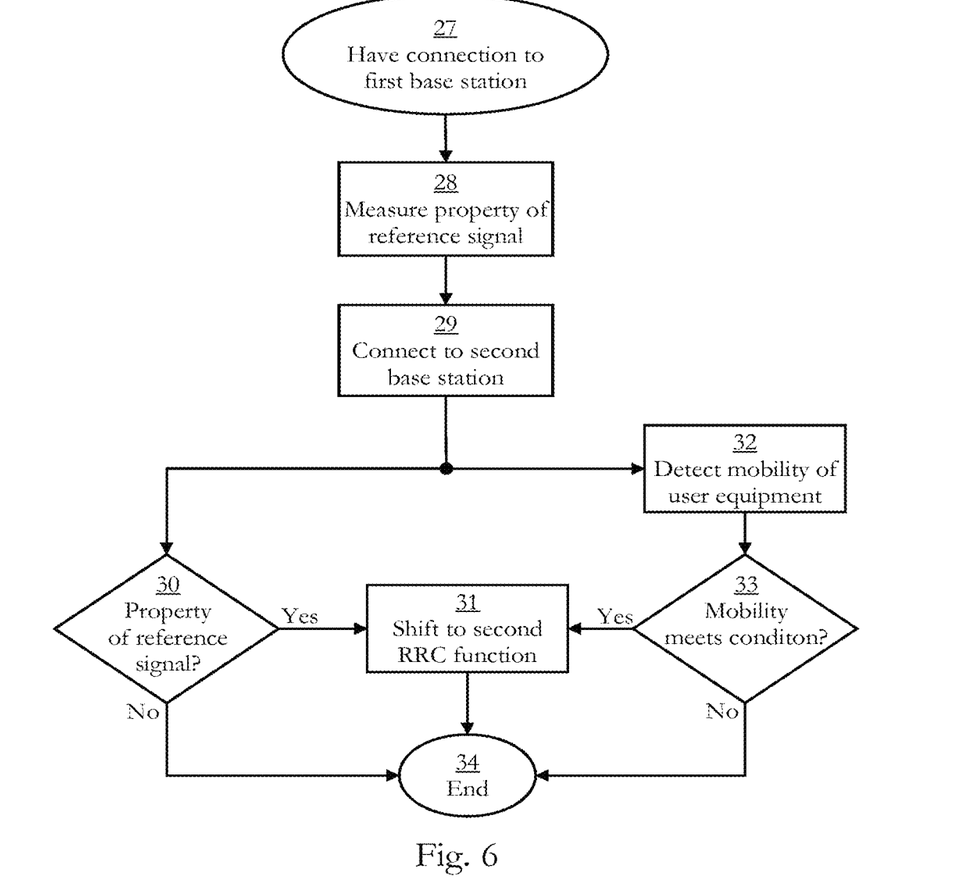
FIG. 6 shows a flowchart of a method for a dynamic shift of a RRC function based on a mobility state of a user equipment.

FIG. 6 shows a flowchart of a mobile telecommunications system method for a dynamic shift of a RRC function based on a mobility state of a UE 1.

At 27 of the method, a UE 1 holds a connection to a first base station operating in a first mobile telecommunications system. For example, the first mobile telecommunications system is LTE, and the first base station is a LTE eNodeB 4. However, in another embodiment, the first mobile telecommunications system can be any other mobile telecommunications system, such as LTE-A, LTE-B, or the like.

At 28, a property of a reference signal received by the UE 1 from a second base station operating in a second mobile telecommunications system is measured. The second base station is a NR eNodeB 6, but it can also be a UE serving as a NR base station in another embodiment.

The measured property of the reference signal may be, for example, a RSRP, a RSRQ, or any other quantity indicating a signal quality.

At 29, a first RRC function specified in the first mobile telecommunications system establishes a connection to the second base station 6 in addition to the connection to the first base station 4.

Then, at 30, the network may decide, based on the measured property of the reference signal, to shift a RRC functionality from a first RRC function specified in the first mobile telecommunications system to a second RRC functionality, which is specified in the second mobile telecommunications system.

At 31, a RRC functionality is shifted from a first RRC function specified in the first mobile telecommunications system to a second RRC functionality, which is specified in the second mobile telecommunications system. The RRC functionality shifted may include provision of system information, RRC connection control, network-controlled inter-RAT mobility, measurement configuration, and/or measurement reporting.

At 32, a mobility state of the UE 1 may be detected, and at 33, a decision to shift a RRC functionality from the first RRC function to the second RRC function may be made based on the mobility state, so that 31 is performed and the RRC functionality is shifted if the mobility state of the UE 1 meets a condition. The condition may be, for example, be preconfigured/predetermined, or be configured by the first RRC function.

The end 34 of the method may be reached if a RRC functionality has been shifted to the second RRC function, or if at 30 and/or 33 a decision is made to not shift RRC functionality.

In some embodiments, RRC diversity provides robustness, flexibility or the like, depending on an operation scheme, operation band, mobility state of UE or the like, as also discussed above. In addition, a dynamic operation scheme among tight interworking of LTE and NR and NR standalone operation might be helpful, in some embodiments, for reducing power consumption, signaling overhead and the like, depending on operation band, mobility state of the UE or the like and as also discussed above.

Figure 7:
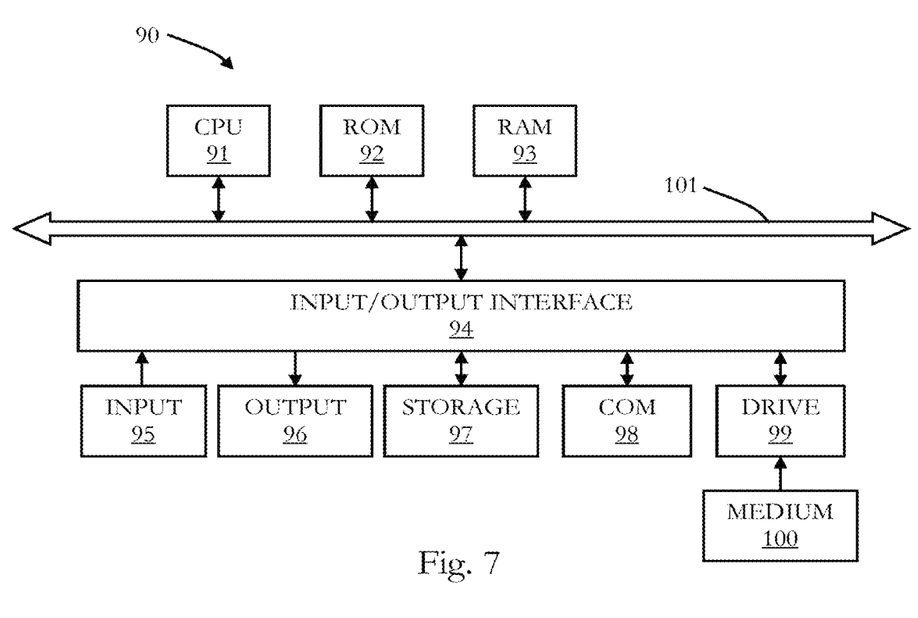
FIG. 7 illustrates a multi-purpose computer which can be used for implementing a mobile telecommunications system base station or user equipment disclosed herein.

FIG. 7 illustrates a multi-purpose computer which can be used for implementing a mobile telecommunications system base station or user equipment disclosed herein.

In the following, an embodiment of a general purpose computer 90 is described under reference of FIG. 7. The computer 90 can be implemented such that it can basically function as any type (anchor, slave, control plane, user plane, etc.) of base station, virtual/slave cell or user equipment as described herein. The computer has components 91 to 100, which can form a circuitry, such as any one of the circuitries of the base station, virtual cell, slave cell, and user equipment, as described herein.

Embodiments which use software, firmware, programs or the like for performing the methods as described herein can be installed on computer 90, which is then configured to be suitable for the concrete embodiment.

The computer 90 has a CPU 91 (Central Processing Unit), which can execute various types of procedures and methods as described herein, for example, in accordance with programs stored in a read-only memory (ROM) 92, stored in a storage 97 and loaded into a random access memory (RAM) 93, stored on a medium 100 which can be inserted in a respective drive 99, etc.

The CPU 91, the ROM 92 and the RAM 93 are connected with a bus 101, which in turn is connected to an input/output interface 94. The number of CPUs, memories and storages is only exemplary, and the skilled person will appreciate that the computer 90 can be adapted and configured accordingly for meeting specific requirements which arise, when it functions as a base station, virtual cell and user equipment.

At the input/output interface 94, several components are connected: an input 95, an output 96, the storage 97, a communication interface 98 and the drive 99 into which a medium 100 (compact disc, digital video disc, compact flash memory, or the like) can be inserted.

The input 95 can be a pointer device (mouse, graphic table, or the like), a keyboard, a microphone, a camera, a touchscreen, etc.

The output 96 can have a display (liquid crystal display, cathode ray tube display, light emittance diode display, etc.), loudspeakers, etc.

The storage 97 can have a hard disk, a solid state drive and the like.

The communication interface 98 can be adapted to communicate, for example, via a local area network (LAN), wireless local area network (WLAN), mobile telecommunications system (GSM, UMTS, LTE, NR, etc.), Bluetooth, infrared, mmWave, etc.

It should be noted that the description above only pertains to an example configuration of computer 90. Alternative configurations may be implemented with additional or other sensors, storage devices, interfaces or the like. For example, the communication interface 98 may support other radio access technologies than the mentioned UMTS, LTE, and NR.

When the computer 90 functions as a base station, the communication interface 98 can further have a corresponding air interface (providing e.g. E-UTRA protocols OFDMA (downlink) and SC-FDMA (uplink)) and network interfaces (implementing for example protocols such as S1-AP, GTP-U, S1-MME, X2-AP, or the like). The present disclosure is not limited to any particularities of such protocols.

It should be recognized that the embodiments describe methods with an exemplary ordering of method steps. The specific ordering of method steps is however given for illustrative purposes only and should not be construed as binding. For example the ordering of 9, 10, 11 and 12 in the embodiment of FIG. 2 may be exchanged. Also, the ordering of 13, 14, and 15 in the embodiment of FIG. 3 may be exchanged. Further, also the ordering of 21, 22, 23, 24, and 25 in the embodiment of FIG. 4 may be exchanged. Moreover, also the ordering of 30, 31, 32, and 33 in the embodiment of FIG. 6 may be exchanged. Other changes of the ordering of method steps may be apparent to the skilled person.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using a software-controlled data processing apparatus, it will be appreciated that a computer program providing such software control and a transmission, storage or other medium by which such a computer program is provided are envisaged as aspects of the present disclosure.

It is noted that the present technology can also be configured as described below.

(1) A mobile telecommunications system method comprising:
  measuring a property of a first received reference signal from a first base station operating in a first mobile telecommunications system;
  measuring a property of a second received reference signal from a second base station or a user equipment operating in a second mobile telecommunications system; and
  switching from the first base station to the second base station as a serving base station based on the property of the first received reference signal and on the property of the second received reference signal.

(2) The mobile telecommunications system method of (1), further comprising switching from a first Radio Resource Control (RRC) function specified in the first mobile telecommunications system to a second RRC function specified in the second mobile telecommunications system.

(3) The mobile telecommunications system method of (2), wherein each RRC function handles at least one of a provision of system information, RRC connection control, network controlled inter-RAT mobility, measurement configuration, and measurement reporting.

(4) The mobile telecommunications system method of (2) or (3), further comprising:
  the second RRC function establishing a connection to the second base station; and
  measuring a property of a third received reference signal from a third base station operating in the first mobile telecommunications system.

(5) The mobile telecommunications system method of (4), further comprising the second RRC function establishing a connection to the third base station in addition to the connection to the second base station.

(6) The mobile telecommunications system method of anyone of (2) to (5), wherein the second RRC function provides signaling related to RRC via both connections to the second base station and to the third base station.

(7) The mobile telecommunications system method of (5) or (6), further comprising the second RRC function establishing the connection to the third base station based on a first threshold for the property of the third received reference signal.

(8) The mobile telecommunications system method of anyone of (5) to (7), further comprising the second RRC function releasing the connection to the third base station based on a second threshold for the property of the third received reference signal.

(9) The mobile telecommunications system method of anyone of (5) to (8), further comprising:
  the second RRC function establishing the connection to the third base station in addition to the connection to the second base station, when an operating frequency of the second base station is higher than a predetermined value or a value configured by the first RRC function or the second RRC function.

(10) The mobile telecommunications system method of anyone of (5) to (9), wherein the connection to the third base station is released in accordance with expiration of a timer, wherein duration of the timer may be predetermined by the second or third base station.

(11) A mobile telecommunications system method, wherein a connection of a user equipment to a first base station operating in a first mobile telecommunications system is established, wherein a first RRC function specified in the first mobile telecommunications system provides signaling related to RRC via the connection to the first base station, the method comprising:
  measuring a property of a received reference signal from a second base station or the user equipment operating in a second mobile telecommunications system; and
  the first RRC function establishing a connection to the second base station in addition to the connection to the first base station.

(12) The mobile telecommunications system method of (11), wherein the first RRC function handles at least one of a provision of system information, RRC connection control, network controlled inter-RAT mobility, measurement configuration, and measurement reporting.

(13) The mobile telecommunications system method of (11) or (12), further comprising shifting, based on a threshold for the property of the received reference signal, to a second RRC function specified in the second mobile telecommunications system at least one of a provision of system information, RRC connection control, network controlled inter-RAT mobility, measurement configuration, and measurement reporting handled by the first RRC function, wherein the second RRC function provides signaling related to RRC via the connection to the second base station.

(14) The mobile telecommunications system method of anyone of (11) to (13), further comprising:
detecting a mobility state of a user equipment; and
shifting, when the mobility state meets a predetermined condition or a condition configured by the first RRC function, to the second RRC function specified in the second mobile telecommunications system at least one of the provision of system information, RRC connection control, network controlled inter-RAT mobility, measurement configuration, and measurement reporting handled by the first RRC function.

The invention claimed is:

1. A mobile telecommunications system method comprising:
measuring a property of a first received reference signal from a first base station operating in a first mobile telecommunications system;
measuring a property of a second received reference signal from a second base station or a user equipment operating in a second mobile telecommunications system;
switching from the first base station to the second base station as a serving base station based on the property of the first received reference signal and on the property of the second received reference signal;
switching from a first radio resource control function specified in the first mobile telecommunications system to a second radio resource control function specified in the second mobile telecommunications system; and
connecting to a third base station in the first mobile telecommunications system in accordance with a property of a third reference signal from the third base station or in accordance with an operation frequency of the second base station, wherein
the second radio resource control function
establishes a connection to the second base station,
measures the property of the third reference signal from the third base station operating in the first mobile telecommunications system, and
establishes the connection to the third base station in addition to the connection to the second base station.

2. The mobile telecommunications system method of claim 1, wherein each radio resource control function handles at least one of: a provision of system information, radio resource control connection control, network controlled inter-RAT mobility, measurement configuration, and measurement reporting.

3. The mobile telecommunications system method of claim 1, wherein the second radio resource control function provides signaling related to radio resource control via both connections to the second base station and to the third base station.

4. The mobile telecommunications system method of claim 1, further comprising the second radio resource control function establishing the connection to the third base station based on a first threshold for the property of the third reference signal.

5. The mobile telecommunications system method of claim 4, further comprising:
the second radio resource control function establishing the connection to the third base station in addition to the connection to the second base station, when the operating frequency of the second base station is higher than a predetermined value or a value configured by the first radio resource control function or the second radio resource control function.

6. The mobile telecommunications system method of claim 1, further comprising the second radio resource control function releasing the connection to the third base station based on a second threshold for the property of the third reference signal.

7. The mobile telecommunications system method of claim 1, wherein the connection to the third base station is released in accordance with expiration of a timer, wherein duration of the timer may be predetermined by the second or third base station.

8. The mobile telecommunications system method of claim 1, further comprising:
comparing the property of the third reference signal to a second threshold to determine a second comparison, and
uphold or release the connection from the third base station in accordance with the second comparison.

9. A mobile telecommunications system method, wherein a connection of a user equipment to a first base station operating in a first mobile telecommunications system is established, wherein a first radio resource control function specified in the first mobile telecommunications system provides signaling related to radio resource control via the connection to the first base station, the method comprising:
measuring a property of a received reference signal from a second base station or the user equipment operating in a second mobile telecommunications system;
the first radio resource control function establishing a connection to the second base station in addition to the connection to the first base station; and
shifting from the first radio resource control function specified in the first mobile telecommunications system to a second radio resource control function specified in the second mobile telecommunications system in accordance with the property of the received reference signal or with a mobility state of the user equipment, wherein the second radio resource control function provides sienalinE related to radio resource control via the connection to the second base station.

10. The mobile telecommunications system method of claim 9, wherein the first radio resource control function handles at least one of: a provision of system information, radio resource control connection control, network controlled inter-RAT mobility, measurement configuration, and measurement reporting.

11. A communications device, comprising:
circuitry configured to
measure a first property of a first reference signal received from a first base station in a first mobile device telecommunications system serving as a base station for the communications device,
measure a second property of a second reference signal received from a second base station in a second mobile device telecommunications system,
switch from the first base station to the second base station in accordance with the first and second properties,
compare an operation frequency of the second base station to a third threshold to determine a third comparison, and
connect to a third base station in the first mobile device telecommunications system in accordance with the third comparison.

12. The communications device of claim 11, wherein the circuitry is further configured to switch from a first radio resource control function specified in the first mobile device telecommunications system to a second radio resource control function specified in the second mobile device telecommunications system.

13. The communications device of claim 11, wherein the circuitry is further configured to compare a property of a third reference signal from the third base station to a first threshold to determine a first comparison, and connect to the third base station in accordance with the first comparison.

14. The communications device of claim 11, wherein the circuitry is further configured to compare a property of a third reference signal from the third base station to a second threshold to determine a second comparison, and uphold or release the connection from the third base station in accordance with the second comparison.

15. A communications device, comprising:

circuitry configured to receive a first reference signal from a first base station in a first mobile device telecommunications system serving as a base station for the communications device, connect to a second base station in a second mobile device telecommunications system, and shifting from a first radio resource control function specified in the first mobile device telecommunications system to a second radio resource control function specified in the second mobile device telecommunications system in accordance with a property of the first reference signal or with a mobility state of the communications device, wherein the second radio resource control function provides signaling related to radio resource control via the connection to the second base station.

* * * * *